United States Patent [19]

Takahashi

[11] Patent Number: 5,769,068
[45] Date of Patent: Jun. 23, 1998

[54] APPARATUS FOR SUPPORTING A SOLAR COLLECTOR UNIT

[76] Inventor: Kei Takahashi, 1-14-16 Achi, Kurashiki, Okayama 710, Japan

[21] Appl. No.: 803,017

[22] Filed: Feb. 21, 1997

[30] Foreign Application Priority Data

Feb. 27, 1996 [JP] Japan .................................... 8-067163

[51] Int. Cl.⁶ ...................................................... F24J 2/00
[52] U.S. Cl. .......................... 126/569; 126/696; 126/704; 165/67
[58] Field of Search ................................. 126/569, 696, 126/600, 680, 621, 651, 684, 704, 700, 697, 671; 165/67

[56] References Cited

U.S. PATENT DOCUMENTS 4,173,396  11/1979  Simpson ................................. 126/696
4,656,996  4/1987  Aharon .................................... 126/600
4,832,001  5/1989  Baer ....................................... 126/696
5,069,540  12/1991  Gonder ................................... 126/696

Primary Examiner—James C. Yeung
Attorney, Agent, or Firm—Weiner, Carrier, Burt & Esser, P.C.; Joseph P. Carrier; Irving M. Weiner

[57] ABSTRACT

An apparatus for supporting a solar collector unit comprises a pair of spaced carriers, and a support net for supporting a solar collector unit thereon. The support net includes a set of longitudinal wires extending between the carriers, and a set of transverse wires extending in a direction transverse to the longitudinal wires and welded thereto. A pair of tension mechanisms are mounted to the carriers to adjust the tension of the longitudinal wires. The tension mechanisms include holders for holding opposite ends of the longitudinal wires between the carriers, and fasteners operatively associated with the holders to adjust the tension of the longitudinal wires so that the longitudinal wires are aligned in a transverse direction.

14 Claims, 5 Drawing Sheets

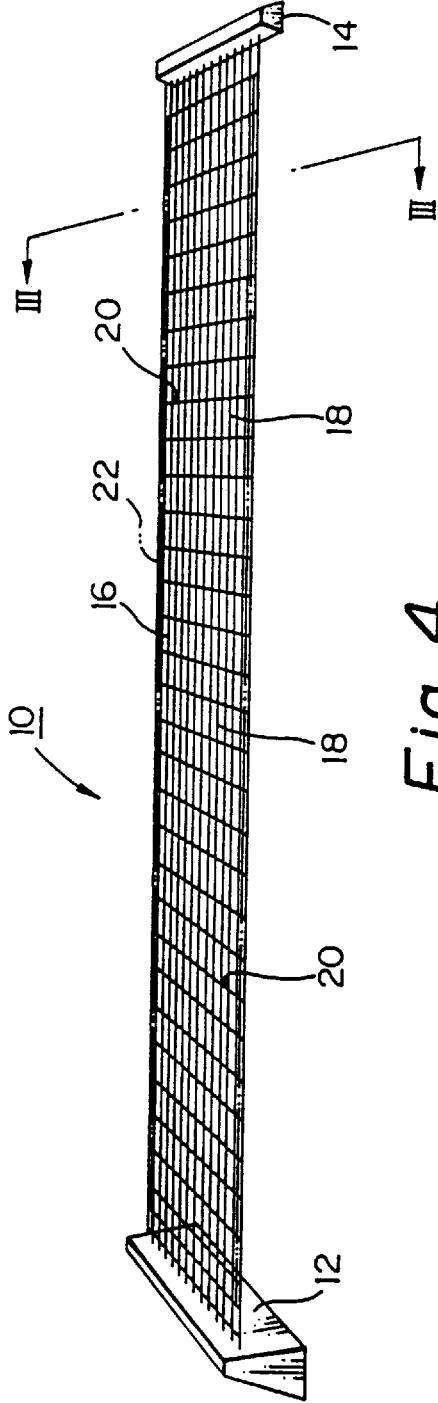
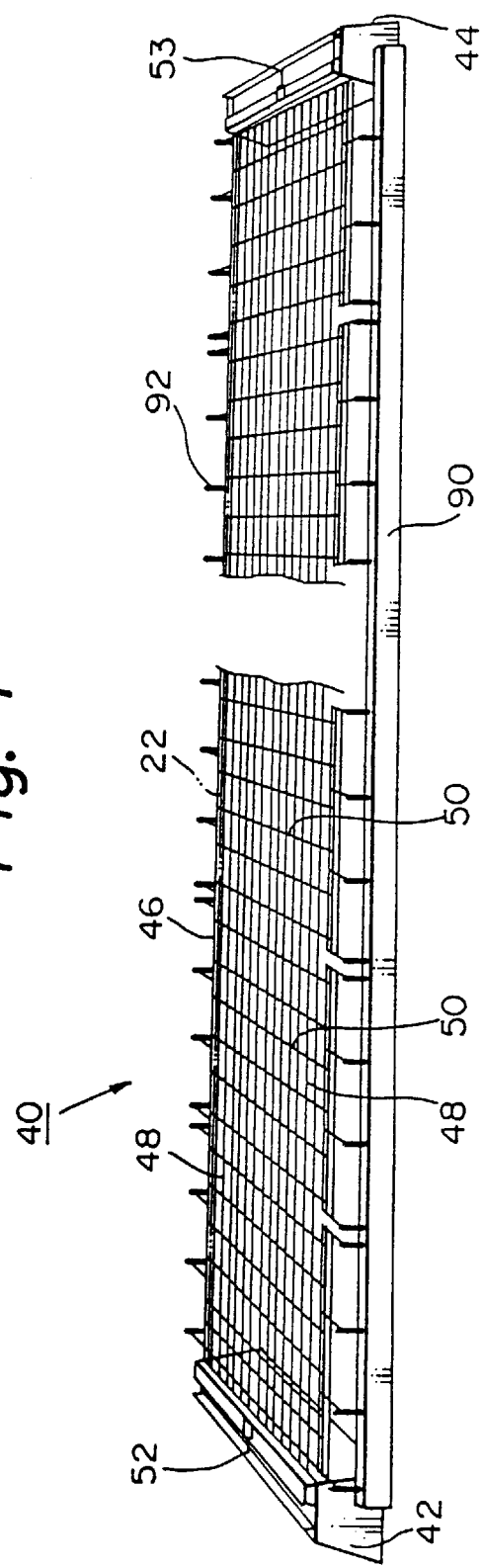

APPARATUS FOR SUPPORTING A SOLAR COLLECTOR UNIT

BACKGROUND OF THE INVENTION

1. Field of the Invention

The present invention relates to an apparatus for supporting a solar collector unit, and more particularly, to a mechanism for adjusting the tension of a support net on which the solar collector unit is mounted.

2. Description of the Related Art

A known solar power system typically includes ropes, support posts or frames so as to support a solar collector unit. However, such a solar collector panel is likely to be bent or twisted as it is subjected to wind or other external loads. To this end, attempts have been made to add auxiliary frames or other means in order to increase the rigidity and stability of the solar collector unit. However, this results in an increase in the production cost of the overall solar power system.

Accordingly, it is an object of the present invention to provide a novel apparatus for supporting a solar collector unit wherein the tension of a support net can be adjusted to accurately control the flow of a heat transfer fluid therethrough to maximize heat transfer performance.

It is another object of the present invention to provide an apparatus for supporting a solar collector unit which is simple in structure and is economical to manufacture.

SUMMARY OF THE INVENTION

According to one aspect of the present invention, there is provided an apparatus for supporting a solar collector unit comprising a pair of spaced carriers, support means adapted to support a solar collector unit thereon and including a first set of elongated elements extending between the carriers, and a second set of elongated elements extending in a direction transverse to the first set of elongated elements and connected thereto, and tension means mounted to at least one of the carriers for adjusting the tension of the first set of elongated elements. The tension means includes holder means for holding the first set of elongated elements between the carriers, and fastener means operatively associated with the holder means to adjust the tension of the first set of elongated elements so that the first set of elongated elements are aligned in a transverse direction.

Preferably, the holder means comprises a holder mounted on at least one of the carriers, and the fastener means comprises a plurality of externally threaded elements on one end of the first set of elongated elements, and a plurality of internally threaded nuts threadingly engaged with the externally threaded elements.

Preferably, second tension means is provided to move the holder. The second tension means comprises a tension member fixed to at least one of the carriers and including a plurality of hooks. The holder includes a plurality of brackets. Each of the brackets has an aperture. Each of the hooks has one end secured to the tension member and the other end received in the aperture, whereby the holder is moved toward and away from the tension member.

According to another aspect of the present invention, there is provided an apparatus for supporting a solar collector unit comprising a pair of spaced carrier made of concrete, and a support net for supporting a solar collector unit thereon. The support net is composed of a plurality of longitudinally extending wires arranged substantially in parallel and having opposite ends embedded in the carriers, and a plurality of laterally extending wires extending in a direction transverse to the longitudinally extending wires and secured thereto.

BRIEF DESCRIPTION OF THE DRAWINGS

The present invention will now be described by way of example with reference to the accompanying drawings, in which:

FIG. 1 is a perspective view of an apparatus for supporting a solar collector unit according to one embodiment of the present invention;

FIG. 4 is an apparatus for supporting a solar collector unit according to another embodiment of the present invention;

DESCRIPTION OF THE PREFERRED EMBODIMENTS

Figure 2:
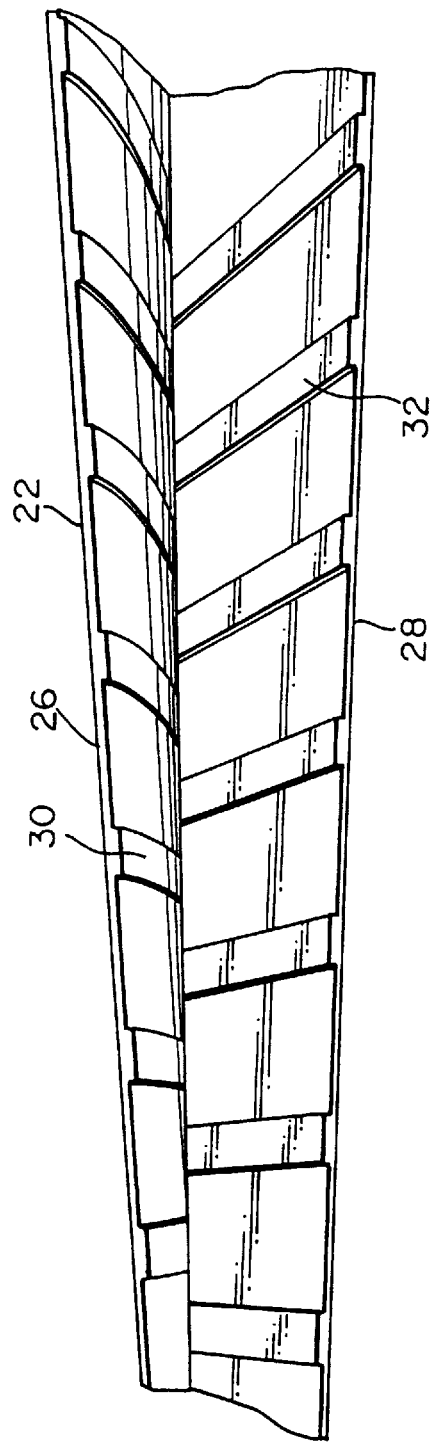
FIG. 2 is an exploded perspective view, on an enlarged scale, of the solar collector unit shown in FIG. 1.

Referring now to FIG. 1, there is shown an apparatus for supporting a solar collector unit or panel generally designated by numeral 10 and made according to one embodiment of the present invention. The apparatus 10 generally includes a pair of spaced anchors or carriers 12, 14 made of concrete, and a substantially rectangular support net 16 made, for example, of steel and extending between the carriers 12, 14. The support net 16 is composed of a set of longitudinal wires 18 secured between the carriers 12, 14 and another set of transverse wires 20 extending in a direction transverse to the longitudinal wires 18 and welded or otherwise secured thereto. Illustratively, the longitudinal wires 18 have a diameter of 6 mm and a length of 6 m. The transverse wires 20 have a diameter of 6 mm and a length of 2 m. The longitudinal wires 18 and the transverse wires 20 are secured to form a lattice shape. The distance between the longitudinal wires 18 and between the transverse wires 20 is in the range from 10 to 50 mm. A plurality of support nets may be interconnected to provide a larger support net. Such a large support net may have a length of over 100 m and a width of 12m.

Figure 3:
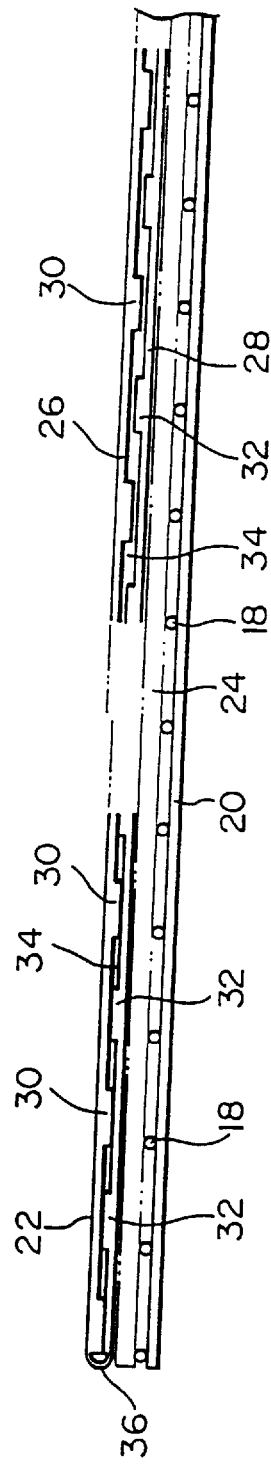
FIG. 3 is a sectional view taken on the line III—III in FIG. 1.

Referring to FIGS. 2 and 3, a substantially rectangular solar collector panel 22 is mounted on the support net 16 through an insulation or support sheet 24. The solar collector panel 22 includes an upper sheet 26 and a lower sheet 28. The upper sheet 26 has a plurality of elongated ridges 30 arranged in parallel along the width of the support net 16. Likewise, the lower sheet 28 has a plurality of elongated ridges 32 arranged in parallel along the width of the support net 16. The upper sheet 26 is placed on the lower sheet 28 so that each of the ridges 30 in the upper sheet 26 is positioned between adjacent ridges 32 in the lower sheet 28 so as to define a plurality of parallel fluid passages 34. One end of the support net 16 secured to the carrier 12 is higher than the other end of the support net 16 secured to the carrier 14 to insure that a heat transfer fluid such as water flows downwardly through the fluid passages 34. A substantially flat tubular element 36 surrounds the upper sheet 26 and the lower sheet 28. When a pressure increase occurs within the panel 22, or the flow rate of a fluid is increased, then the upper sheet 26 is moved up relative to the lower sheet 28 so as to increase the effective cross sectional area of the passages 34 as shown at the right half of FIG. 3. This accommodates such a pressure increase within the panel 22 and insures that the fluid flows along the passages.

Referring to FIG. 4, there is shown an apparatus for supporting a solar collector panel generally designated by numeral 40 and made according to another embodiment of the present invention. As in the previous embodiment, the apparatus 40 includes a pair of spaced carriers 42, 44 made of concrete, and a substantially rectangular support net 46 made of steel and extending between the carriers 42, 44. The support net 46 is composed of a set of longitudinal wires 48 arranged in parallel along the width of the carriers, and another set of transverse wires 50 extending at right angles to the longitudinal wires 48 and welded or otherwise secured thereto. Illustratively, the longitudinal wires 48 have a diameter of approximately 6 mm and a length of approximately 6 m. The transverse wires 50 have a diameter of approximately 6 mm and a length of approximately 2 m. It should be understood that the longitudinal and transverse wires may be replaced by steel rods or bars. The distance between the longitudinal wires 48 and between the transverse wires 50 is in the range from 10 to 50 mm. The solar collector panel 22 is mounted on the support net 46 as shown by a broken line in FIG. 4.

Figure 5:
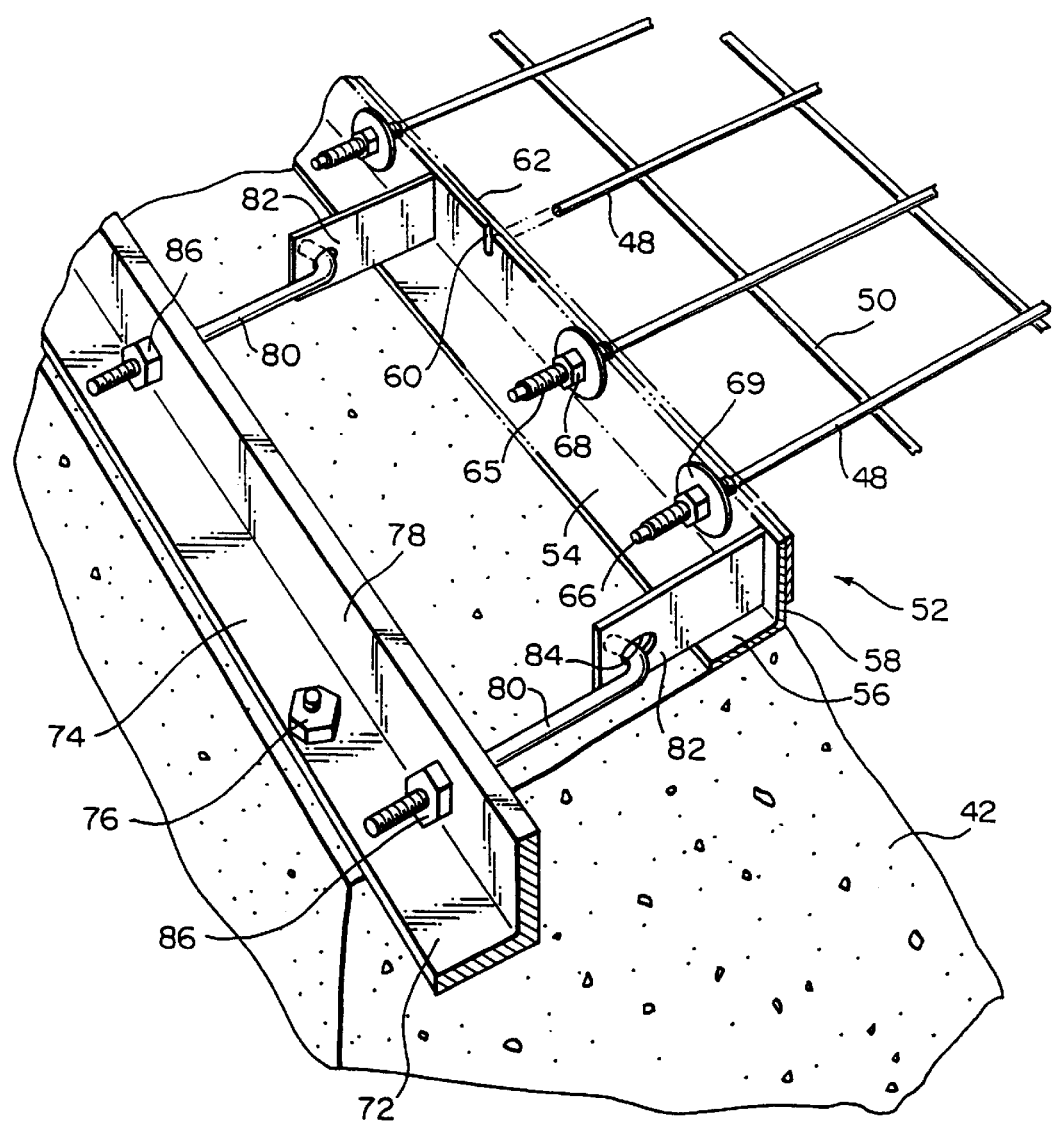
FIG. 5 is an enlarged perspective view, in part, of the apparatus shown in FIG. 4, showing a mechanism for adjusting the tension of a support net.
Figure 6:
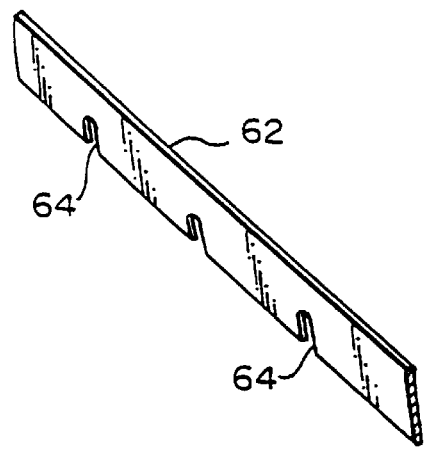
FIG. 6 is a perspective view of a retainer plate shown in FIG. 5.
Figure 7:
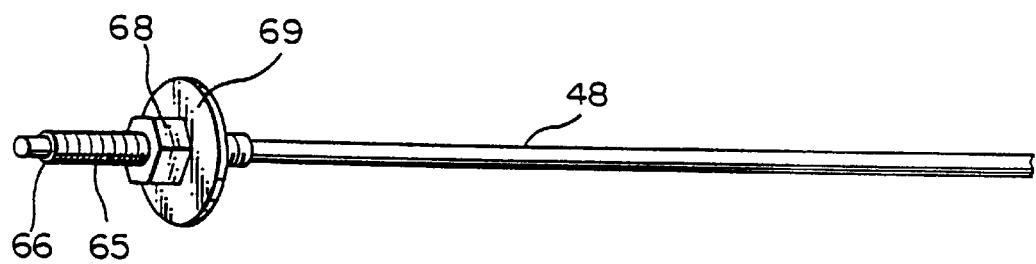
FIG. 7 is a partial perspective view of a longitudinal wire and a bolt threaded on the wire shown in FIG. 5.
Figure 8:
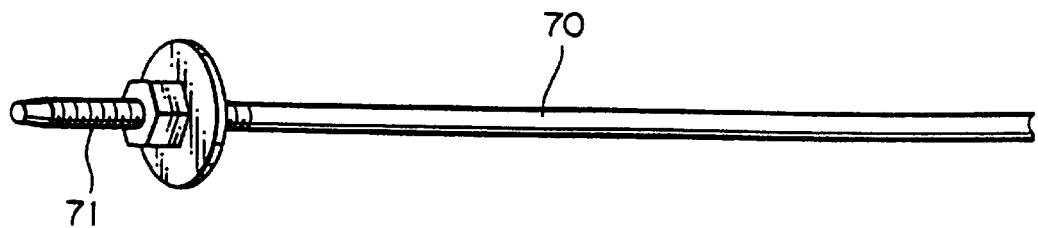
FIG. 8 is a view similar to that of FIG. 7, but showing a modified form of the longitudinal wire.

As an important feature of the present invention, a pair of right and left tension mechanisms 52, 53 are included in the apparatus 40 in order to adjust the tension of the longitudinal wires 48. Reference will now be made to the right tension mechanism 52 only since the left tension mechanism 53 is a mirror image. As shown best in FIG. 5, the tension mechanism 52 includes an elongated holder 54 arranged on one side of the top of the carrier 42. The holder 54 has a L-shaped section and includes a horizontal member 56 placed on the top of the carrier 42, and a vertical member 58 extending upwardly from one side of the horizontal member 56. A plurality of recesses 60 are formed in the upper end of the vertical member 58 and arranged at equal intervals to receive one end of each of the longitudinal wires 48. As shown better in FIG. 6, a retainer plate 62 has a plurality of recesses 64 fit around the longitudinal wires 48. The retainer plate 62 is bolted or otherwise secured to the vertical member 58 to hold the longitudinal wires 48 in place. As shown in FIG. 7, an externally threaded tube or sleeve 65 is fit around one end of each of the longitudinal wires 58 and welded as at 66 to the longitudinal wires 48. An adjusting nut 68 is threaded on the sleeve 65. A washer 69 is placed between the nut 68 and the vertical member 58 of the holder 54. With this arrangement, the tension of the longitudinal wires 48 can be individually adjusted by tightening or loosening the nuts 68. It should be note that in lieu of the threaded sleeve 65, each of the longitudinal wires 70 may have an externally threaded end 71 as shown in FIG. 8.

As another feature of the present invention, all of the longitudinal wires 48 can be adjusted at once. To this end, tension means 72 is fixed to the other side of the top of the carrier 42 in order to move the holder 54 toward and away from the tension means 72. The tension means 72 includes a horizontal member 74 bolted as at 76 to the top of the carrier 42, and a vertical member 78 extending upwardly from the horizontal member 74. A plurality of hooks 80 of a generally J-shape extend from the vertical member 78 toward the holder 54 and are arranged at equal intervals along the length of the tension means. A plurality of brackets 82 extend from the vertical member 58 toward the tension means 72 and are arranged at equal intervals along the length of the holder. Each of the brackets 82 includes an aperture 84. Each of the hooks 80 has one end bolted as at 86 to the vertical member 78 and the other end received in the aperture 84 of the bracket 82. With this arrangement, the bolts 86 are tightened to pull the holder 54 toward the tension means 72 to increase the tension of all of the longitudinal wires 48. Conversely, the bolts 86 are loosened to move the holder 54 away from the tension means 72 to decrease the tension of all of the longitudinal wires 48.

It should be noted that as shown in FIG. 4, the transverse wires 50 may be adjusted by a pair of tension mechanisms 52, 53 as required.

Figure 9:
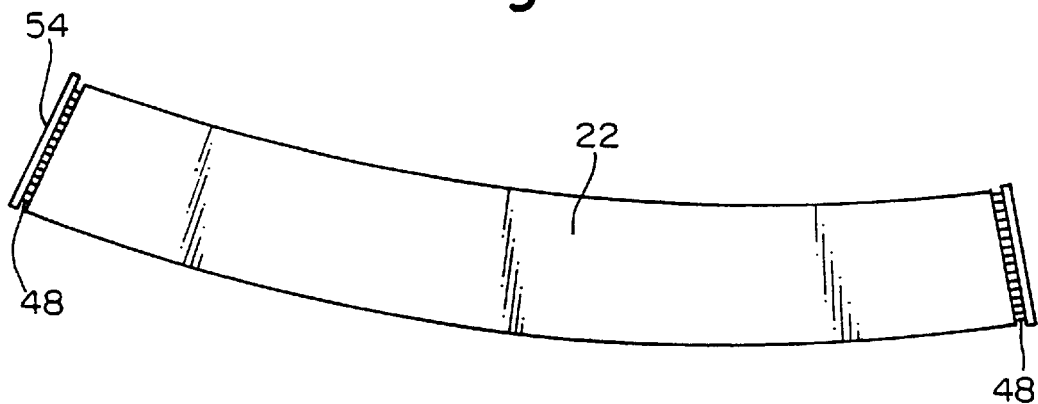
FIG. 9 is a schematic view of the apparatus shown in FIG. 4, with the support net being slightly downwardly curved.
Figure 10:
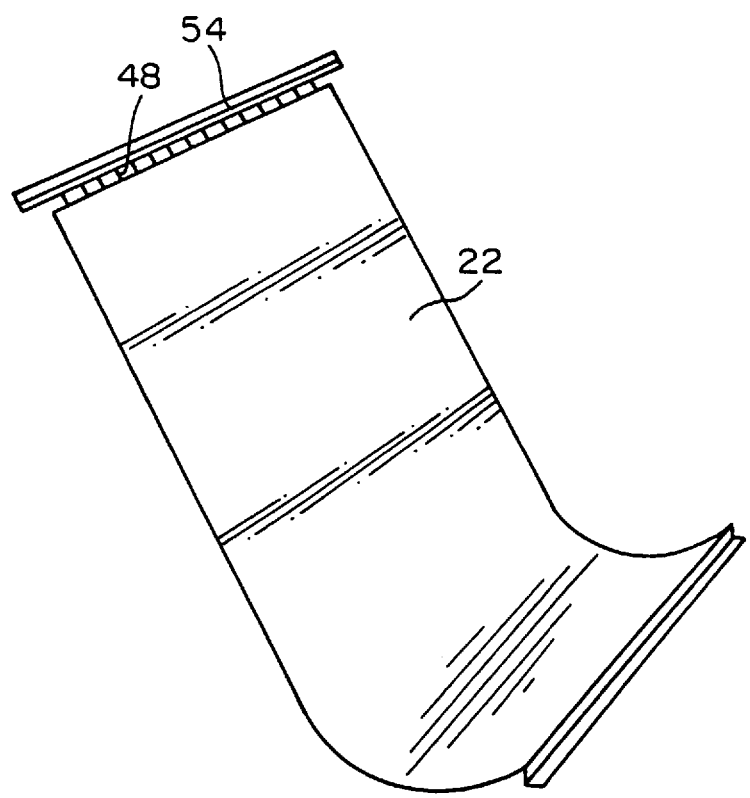
FIG. 10 is a view similar to that of FIG. 9, but showing the manner in which the support net is suspended in an inclined fashion.

The solar collector panel 22 may not necessarily extend in a flat plane. As shown in FIG. 9, the solar collector panel 22 may be slightly downwardly curved between the carriers (not shown in FIG. 9). However, in order to accurately control the flow of a fluid through the solar collector panel 22, adjustment should be made to align the longitudinal wires 48 in a transverse direction. In FIG. 10, the solar collector panel 22 is mounted as extending in an inclined fashion. In this case, also, adjustment should be made to align the longitudinal wires 48 in a transverse direction.

The present invention has been described with respect to its preferred embodiments. It will be understood that various modifications and changes may be made without departing from the spirit and scope of the invention as defined by the appended claims.

What is claimed is:

1. An apparatus for supporting a solar collector unit comprising:

a pair of spaced carriers;

support means for supporting a solar collector unit thereon, said support means including a first set of elongated elements extending between said pair of carriers, and a second set of elongated elements extending in a direction transverse to said first set of elongated elements and connected thereto; and tension means mounted to at least one of said pair of carriers for adjusting tension of said first set of elongated elements, said tension means including holder means for holding said first set of elongated elements between said pair of carriers, and fastener means operatively associated with said holder means to adjust the tension of said first set of elongated elements so that said first set of elongated elements are aligned in a transverse direction.

2. The apparatus of claim 1, wherein said holder means comprises a holder mounted on said at least one of said pair of carriers, and wherein said fastener means comprises a plurality of externally threaded elements on one end of said first set of elongated elements, and a plurality of internally threaded nuts threadingly engaged with said plurality of externally threaded elements.

3. The apparatus of claim 2, wherein said holder includes a plurality of recesses through which said one end of said first set of elongated elements extend, further comprising a retainer plate secured to said holder and including a plurality of corresponding recesses through which said one end of said first set of elongated elements extend, said holder and said retainer plate cooperating together to secure said first set of elongated elements in place.

4. The apparatus of claim 2, further comprising second tension means for moving said holder on said at least one of said pair of carriers.

5. The apparatus of claim 4, wherein said second tension means comprises a tension member fixed to said at least one of said pair of carriers and including a plurality of hooks, and said holder includes a plurality of brackets, each of said brackets having an aperture, and wherein each of said hooks has one end secured to said tension member and the other end received in said aperture, whereby said holder is moved toward and away from said tension member.

6. The apparatus of claim 5, wherein said externally threaded elements are externally threaded sleeves extending around said one end of said first set of elongated elements.

7. The apparatus of claim 5, wherein said externally threaded elements are external threads formed directly in said one end of said first set of elongated elements.

8. The apparatus of claim 1, wherein said first set of elongated elements and said second set of elongated elements are secured to form a lattice shape.

9. The apparatus of claim 1, wherein said first set of elongated elements and said second set of elongated elements are made of steel.

10. The apparatus of claim 1, wherein said first set of elongated elements and said second set of elongated elements are rods made of steel.

11. The apparatus of claim 4, further comprising third tension means operatively associated with said support means for adjusting tension of said second set of elongated elements.

12. The apparatus of claim 1, wherein said pair of carriers are made of concrete.

13. An apparatus for supporting a solar collector unit comprising:
 a pair of spaced carriers;
 a plurality of longitudinal wires extending between said pair of carriers;
 a plurality of transverse wires extending in a direction transverse to said plurality of longitudinal wires and secured thereto, said plurality of transverse wires cooperating with said plurality of longitudinal wires to support a solar collector unit thereon; and
 tension means for adjusting tension of at least one of said plurality of longitudinal and transverse wires,
 said tension means including holders mounted to said pair of carriers and adapted to hold opposite ends of said at least one of said plurality of longitudinal wires and said plurality of transverse wires, and tension members operatively associated with said holders to tighten and loosen said at least one of said plurality of longitudinal and transverse wires so as to align said at least one of said plurality of longitudinal and transverse wires.

14. An apparatus for supporting a solar collector unit comprising:
 a pair of spaced carriers made of concrete; and
 a support net for supporting a solar collector unit thereon,
 said support net composed of a plurality of longitudinally extending wires arranged substantially in parallel and having opposite ends embedded in said pair of carriers, and a plurality of laterally extending wires extending in a direction transverse to said plurality of longitudinally extending wires and secured thereto.

* * * * *

UNITED STATES PATENT AND TRADEMARK OFFICE
CERTIFICATE OF CORRECTION

PATENT NO : 5,769,068
DATED : June 23, 1998
INVENTOR(S): Kei Takahashi

It is certified that error appears in the above-identified patent and that said Letters Patent is hereby corrected as shown below:

On the cover page, under "References Cited, change "4,173,396" to --4,173,397--.

Signed and Sealed this

Sixth Day of October, 1998

Attest:

BRUCE LEHMAN

Attesting Officer

Commissioner of Patents and Trademarks